United States Patent
Wang et al.

(10) Patent No.: US 11,919,811 B1
(45) Date of Patent: Mar. 5, 2024

(54) CURING AGENT FOR DISPOSAL OF MUNICIPAL SOLID WASTE INCINERATION (MSWI) FLY ASH AND PREPARATION METHOD AND USE METHOD THEREOF

(71) Applicant: DALIAN UNIVERSITY OF TECHNOLOGY, Dalian (CN)

(72) Inventors: Baomin Wang, Dalian (CN); Chengcheng Fan, Dalian (CN); Xiao Han, Dalian (CN); Tianru Li, Dalian (CN); Yunqing Xing, Dalian (CN); Xiong Zhang, Dalian (CN); Sai An, Dalian (CN); Ze Yu, Dalian (CN); Wanli Wang, Dalian (CN)

(73) Assignee: DALIAN UNIVERSITY OF TECHNOLOGY, Dalian (CN)

( * ) Notice: Subject to any disclaimer, the term of this patent is extended or adjusted under 35 U.S.C. 154(b) by 0 days.

(21) Appl. No.: 18/138,763

(22) Filed: Apr. 25, 2023

(30) Foreign Application Priority Data

Aug. 16, 2022 (CN) .......................... 202210979999.3

(51) Int. Cl.
| | |
|---|---|
| *B09B 3/21* | (2022.01) |
| *B09B 101/30* | (2022.01) |
| *C04B 18/10* | (2006.01) |
| *C04B 18/24* | (2006.01) |
| *C04B 22/06* | (2006.01) |
| *C04B 28/02* | (2006.01) |
| *C04B 40/00* | (2006.01) |
| *C04B 103/10* | (2006.01) |
| *C04B 111/00* | (2006.01) |

(52) U.S. Cl.
CPC .............. *C04B 28/021* (2013.01); *B09B 3/21* (2022.01); *C04B 18/101* (2013.01); *C04B 18/248* (2013.01); *C04B 22/062* (2013.01); *C04B 40/0046* (2013.01); *C04B 40/0067* (2013.01); *B09B 2101/30* (2022.01); *C04B 2103/10* (2013.01); *C04B 2111/00767* (2013.01)

(58) Field of Classification Search
CPC ... C04B 28/021; C04B 18/101; C04B 18/248; C04B 22/062; C04B 40/0046; C04B 40/0067; C04B 2103/10; C04B 2111/00767; B09B 3/21; B09B 2101/30
See application file for complete search history.

(56) References Cited

FOREIGN PATENT DOCUMENTS

| | | | |
|---|---|---|---|
| AU | 2020101816 A4 | | 9/2020 |
| CN | 106396533 A | * | 2/2017 |
| CN | 108409176 A | | 8/2018 |
| CN | 110922108 A | | 3/2020 |
| CN | 112714755 A | * | 4/2021 |
| CN | 112871143 A | | 6/2021 |
| CN | 114014613 A | * | 2/2022 |
| CN | 114538839 A | | 5/2022 |
| EP | 2514727 A2 | * | 10/2012 ........... C04B 28/008 |
| JP | 2001316145 A | * | 11/2001 ........... C04B 18/101 |
| JP | 2017024938 A | * | 2/2017 |
| KR | 101503841 B1 | * | 3/2015 |
| WO | WO-2019151485 A1 | * | 8/2019 |

OTHER PUBLICATIONS

Sen, Sikander, and Er. Ankit. "An Experimental Study of Concrete Mix by Adding Natural Fiber (Zucchini Fiber/Luffa Fiber)." International Journal of Civil Engineering and Technology, vol. 9, No. 7, Jul. 16, 2018, pp. 724-732, https://doi.org/https://iaeme.com/Home/article_id/IJCIET_09_07_075. (Year: 2018).*
Anandaraj, S., et al. "Strength properties of luffa fibre reinforced concrete containing RHA as cement replacement." Materials Today : Proceedings, vol. 52, 2022, pp. 1817-1820, https://doi.org/10.1016/j.matpr.2021.11.471. (Year: 2021).*
English machine translation of CN-114014613-A (Year: 2022).*
English machine translation of KR-101503841-B1 (Year: 2015).*
English machine translation of WO-2019151485-A1 (Year: 2019).*
English machine translation of JP-2017024938-A (Year: 2017).*
English machine translation of CN-106396533-A (Year: 2017).*
English machine translation of CN-112714755-A (Year: 2021).*
English machine translation of JP-2001316145-A (Year: 2001).*
Zhang Ju-Bao, et al., Comparative Study on the Adsorption Characteristics of Cu( II ) by Rice Husk, Loofah and Corn Cob*, Guangzhou Chemical Industry, 2020, pp. 86-88, vol. 48, No. 10.

* cited by examiner

*Primary Examiner* — Jennifer A Smith
*Assistant Examiner* — Jeffrey Eugene Barzach
(74) *Attorney, Agent, or Firm* — Bayramoglu Law Offices LLC

(57) ABSTRACT

A curing agent for disposal of municipal solid waste incineration (MSWI) fly ash and a preparation method and use method thereof are provided. In the present disclosure, a loofah nanofiber crystal, a rice husk ash (RHA), sodium hydroxide, and water are adopted as raw materials to prepare the curing agent, and the curing agent can effectively realize the safe disposal and curing of heavy metals in an MSWI fly ash. The highest curing rates of the curing agent for heavy metals $Pb^{2+}$, $Zn^{2+}$, $Cd^{2+}$, $Cr^{3+}$, and $Cu^{2+}$ can reach 99.7%, 99.4%, 99.5%, 98.7%, and 99.5%, respectively. The special three-dimensional (3D) cross-linked network structure of the loofah nanofiber crystal and the excellent physical and chemical adsorption properties and ion exchange capacity of the RHA are fully used in the curing agent of the present disclosure.

13 Claims, No Drawings

CURING AGENT FOR DISPOSAL OF MUNICIPAL SOLID WASTE INCINERATION (MSWI) FLY ASH AND PREPARATION METHOD AND USE METHOD THEREOF

CROSS REFERENCE TO THE RELATED APPLICATIONS

This application is based upon and claims priority to Chinese Patent Application No. 202210979999.3, filed on Aug. 16, 2022, the entire contents of which are incorporated herein by reference.

TECHNICAL FIELD

The present disclosure relates to the technical field of solid waste treatment for environmental protection and, in particular, to a curing agent for disposal of municipal solid waste incineration (MSWI) fly ash and a preparation method and use method thereof.

BACKGROUND

At present, with the increasing emission of municipal solid waste (MSW), the effective treatment of MSW is a problem that needs to be addressed. An MSWI technology can simultaneously realize the reduction, resource utilization, and harmless disposal of waste and has become a mainstream technology of MSW disposal in countries around the world. An MSWI fly ash produced accordingly includes a large number of heavy metals and a small number of organic pollutants such as dioxins. Therefore, how to efficiently realize the proper disposal and safe curing of MSWI fly ash has become a key bottleneck for current environmental governance efforts and needs to be solved urgently.

A loofah nanofiber crystal, derived from loofah of the Cucurbitaceae, is composed of three-dimensional (3D) cross-linked network tube bundles formed through the tight combination and crisscrossing of cellulose, hemicellulose, and lignin. The loofah nanofiber crystal has a unique multi-level pore structure and a hydrophilic and lipophilic chemical structure, is eco-friendly, and exhibits excellent acid and alkali resistance and adsorption characteristics for heavy metals and organic pollutants. The loofah nanofiber crystal has a large specific surface area (SSA) and includes many adsorption sites for binding to pollutant molecules such as heavy metals. The surface functional group —OH is enriched in a large quantity in a molecular structure of the loofah nanofiber crystal, which is conducive to the adsorption of pollutants. Diffusion channels formed through the cross-linking of 3D complex networks of cellulose and hemicellulose and a large number of chelation groups provide many adsorption sites and chelation groups for heavy metal ions and the hydroxyl functional group in lignocellulose can efficiently cure heavy metal ions and small molecules of organic pollution poisons through chemical effects such as bonding and coordination.

At present, the annual output of rice husk ash (RHA) reaches tens of millions of tons and most of the RHA is not utilized. The stockpile of a huge amount of RHA not only requires landfill resources but also causes serious safety hazards to environmental soil and water resources. RHA is rich in amorphous $SiO_2$ gel particles at a nanoscale (about 50 nm), has an SSA as high as 100 $m^2/g$, and includes abundant nanopores and polar groups; which can provide many binding sites for the adsorption of heavy metals. Therefore, how to give full play to the performance advantages of RHA and realize the efficient utilization of agricultural solid waste is of great significance for environmental governance.

Therefore, a technical problem that needs to be solved currently is to make full use of high SSA and excellent ion adsorption characteristics of the loofah nanofiber crystal and RHA to obtain a novel curing agent, thereby playing the roles of disposing MSWI fly ash and reducing solid waste.

SUMMARY

An objective of the present disclosure is to provide a curing agent for disposal of an MSWI fly ash and a preparation method and use method thereof, such as to solve the above technical problems.

To achieve the above objective of the present disclosure, the present disclosure provides the following technical solutions.

The present disclosure provides a curing agent for disposal of an MSWI fly ash, where the curing agent is prepared from the following raw materials in parts by mass:
loofah nanofiber crystal 1 to 10 parts;
RHA 30 to 100 parts;
sodium hydroxide 4 to 10 parts; and
water 60 to 100 parts.

Further, the loofah nanofiber crystal has a diameter of 5 nm to 30 nm and a length of 50 nm to 500 nm.

Further, a content of amorphous $SiO_2$ in the RHA is higher than or equal to 95.0%.

The present disclosure provides a preparation method of the curing agent for disposal of an MSWI fly ash, including the following steps:
1) mixing the RHA, the sodium hydroxide, and the water, and subjecting a resulting mixture to an excitation activation reaction to obtain a reaction mixed solution; and
2) dispersing the loofah nanofiber crystal in the reaction mixed solution to obtain the curing agent.

Further, in step 1), the excitation activation reaction is conducted at 80° C. to 160° C. for 2 h to 6 h.

Further, in step 2), the dispersing is achieved by ultrasonic stirring and the ultrasonic stirring is conducted at a rotational speed of 300 rpm to 500 rpm for 30 minutes to 60 minutes.

The present disclosure provides a use method of the curing agent for disposal of an MSWI fly ash, including: mixing the curing agent with an MSWI fly ash and stirring a resulting mixture for 3 minutes to 15 minutes to obtain an MSWI fly ash curing slurry and placing the MSWI fly ash curing slurry in a mold, vibrating for compaction, and curing at room temperature to obtain an MSWI fly ash solidified object.

Further, a mass ratio of the curing agent to the MSWI fly ash is (30-120):100.

The present disclosure has the following beneficial effects:

The present disclosure provides a curing agent for disposal of an MSWI fly ash and a preparation method and use method thereof. The curing agent is prepared from RHA, a loofah nanofiber crystal, and sodium hydroxide. The curing agent can be mixed with a fly ash to prepare a fly ash solidified material with stable and excellent performance and structure.

The present disclosure adopts RHA as a precursor of layered sodium silicate with stable performance, which leads to excellent adsorption characteristics and ion exchange capacity. The loofah nanofiber crystal can be adsorbed on a surface of fly ash particles to provide a large number of steric hindrance and nucleation sites, thereby promoting a hydration process of a fly ash curing matrix and the formation of hydration products. In addition, the loofah nanofiber crystal plays a bridging role in the curing matrix and can effectively fill and improve pore structures of the matrix and promote the development of pore structures from macropores and capillaries to gel pores, thereby realizing the microscopic regulation of structural performance of the matrix. The loofah nanofiber crystal includes very abundant hydrophilic and lipophilic groups and active sites, which facilitates the adsorption and curing of heavy metals and other pollutants in a fly ash.

The fly ash solidified object prepared by the curing agent of the present disclosure has mechanical performance and leaching toxicity that meet standards and the fly ash solidified material is rich in phase components with high SSA and excellent adsorption characteristics such as calcium silicate gel, ettringite, and F salts, which is conducive to the adsorption, curing, and chemical bonding of heavy metals in a fly ash, thereby significantly reducing the potential pollution toxicity of the fly ash solidified object to an ecological environment.

Compared with the prior art, the curing agent provided by the present disclosure can realize the utilization of the loofah crop and RHA, thereby turning waste into treasure and treating waste with waste. The raw materials are eco-friendly, economical, and easy to obtain and the operation process is simple, economical, and efficient, which is of remarkable social, economic, and environmental protection significance and has very promising market prospects.

DETAILED DESCRIPTION OF THE EMBODIMENTS

The present disclosure provides a curing agent for disposal of an MSWI fly ash, where the curing agent is prepared from the following raw materials in parts by mass:
  loofah nanofiber crystal 1 to 10 parts;
  RHA 30 to 100 parts;
  sodium hydroxide 4 to 10 parts; and
  water 60 to 100 parts.

In the present disclosure, in parts by mass, there are 1 to 10 parts, preferably 2 to 8 parts, and more preferably 3 to 6 parts of the loofah nanofiber crystal.

In the present disclosure, the loofah nanofiber crystal has a rod-like structure and the loofah nanofiber crystal has a diameter of 5 nm to 30 nm and a length of 50 nm to 500 nm, preferably, the loofah nanofiber crystal has a diameter of 10 nm to 20 nm and a length of 100 nm to 400 nm, and more preferably, the loofah nanofiber crystal has a diameter of 15 nm and a length of 200 nm to 300 nm.

In the present disclosure, in parts by mass, there are 30 to 100 parts, preferably 50 to 80 parts, and more preferably 60 to 70 parts of the RHA.

In the present disclosure, a content of amorphous $SiO_2$ in the RHA is higher than or equal to 95.0%, preferably higher than or equal to 96.0%, and more preferably higher than or equal to 98.0%.

In the present disclosure, in parts by mass, there are 4 to 10 parts, preferably 5 to 8 parts, and more preferably 6 to 7 parts of the sodium hydroxide.

In the present disclosure, a role of the sodium hydroxide is mainly to realize the excitation activation of performance of the RHA and the optimal regulation of structural performance of the loofah nanofiber crystal.

In the present disclosure, in parts by mass, there are 60 to 100 parts, preferably 70 to 90 parts, and more preferably 80 parts of the water; and in the present disclosure, the water is preferably distilled water.

The present disclosure provides a preparation method of the curing agent for disposal of an MSWI fly ash, including the following steps:
1) the RHA, the sodium hydroxide, and the water are mixed, and a resulting mixture is subjected to an excitation activation reaction to obtain a reaction mixed solution; and
2) the loofah nanofiber crystal is dispersed in the reaction mixed solution to obtain the curing agent.

In the present disclosure, in step 1), the excitation activation reaction is conducted at 80° C. to 160° C. for 2 h to 6 h; preferably, the excitation activation reaction is conducted at 90° C. to 150° C. for 3 h to 5 h; and more preferably, the excitation activation reaction is conducted at 100° C. to 140° C. for 4 h to 5 h.

In the present disclosure, in step 2), the dispersing is achieved by ultrasonic stirring and the ultrasonic stirring is conducted at a rotational speed of 300 rpm to 500 rpm for 30 minutes to 60 minutes, preferably, the ultrasonic stirring is conducted at a rotational speed of 350 rpm to 450 rpm for 40 minutes to 50 minutes, and more preferably, the ultrasonic stirring is conducted at a rotational speed of 400 rpm for 45 minutes.

In addition, the present disclosure provides a use method of the curing agent for disposal of an MSWI fly ash, including: the curing agent is mixed with an MSWI fly ash and a resulting mixture is stirred for 3 minutes to 15 minutes to obtain an MSWI fly ash curing slurry; and the MSWI fly ash curing slurry is placed in a mold, vibrated for compaction, and cured at room temperature to obtain an MSWI fly ash solidified object.

In the present disclosure, the stirring is conducted for preferably 5 minutes to 10 minutes and more preferably 8 minutes.

In the present disclosure, a mass ratio of the curing agent to the MSWI fly ash is (30-120):100, preferably (60-100):100, and more preferably 90:100.

The technical solutions provided by the present disclosure are described in detail below with reference to the examples, but the examples cannot be understood as limiting the protection scope of the present disclosure.

Example 1

A curing agent for disposal of an MSWI fly ash was provided in this example and the curing agent was prepared from the following raw materials in parts by mass: 8 parts of a loofah nanofiber crystal, 90 parts of an RHA, 10 parts of sodium hydroxide, and 90 parts of distilled water, where a content of amorphous $SiO_2$ in the RHA was higher than or equal to 95.0% and the loofah nanofiber crystal had a diameter of 25 nm and a length of 150 nm.

Preparation Steps were as Follows:

The RHA and sodium hydroxide were dissolved in water and a resulting solution was thoroughly mixed, subjected to an excitation activation reaction for 6 h in a high-temperature bath at 150° C. and then cooled to room temperature. The loofah nanofiber crystal was added and a resulting mixture was ultrasonically stirred at 500 rpm for 30 minutes and then poured into an agitator kettle.

An MSWI fly ash was added (a mass ratio of the curing agent to the MSWI fly ash was 90:100), and a resulting mixture was stirred at a high speed for 15 minutes, then placed in a mold, vibrated for compaction and molding, taken out from the mold, and further cured at 20±2° C. until a corresponding age and relevant properties of a product were tested.

An MSWI fly ash solidified object obtained after the treatment by the curing agent in Example 1 had excellent pore structure characteristics and mechanical performance and heavy metals and organic pollutants in the fly ash could be effectively solidified in the solidified object. It was determined through tests that the MSWI fly ash solidified object obtained in Example 1 had a 3 d compressive strength of 10.8 MPa and a 28 d compressive strength of 25.7 MPa, which met the strength requirements for fly ash solidified objects in China and heavy metals in the solidified object each had leaching toxicity lower than a standard limit value.

Example 2

A curing agent for disposal of an MSWI fly ash was provided in this example and the curing agent was prepared from the following raw materials in parts by mass: 2 parts of a loofah nanofiber crystal, 40 parts of an RHA, 5 parts of sodium hydroxide, and 60 parts of distilled water, where a content of amorphous $SiO_2$ in the RHA was higher than or equal to 95.0% and the loofah nanofiber crystal had a diameter of 30 nm and a length of 200 nm.

Preparation Steps were as Follows:

The RHA and sodium hydroxide were dissolved in water, and a resulting solution was thoroughly mixed, subjected to an excitation activation reaction for 2 h in a high-temperature bath at 85° C., and then cooled to room temperature. The loofah nanofiber crystal was added and a resulting mixture was ultrasonically stirred at 400 rpm for 40 minutes and then poured into an agitator kettle. An MSWI fly ash was added (a mass ratio of the curing agent to the MSWI fly ash was 40:100) and a resulting mixture was stirred at a high speed for 5 minutes, then placed in a mold, vibrated for compaction and molding, taken out from the mold, and further cured at 20±2° C. until a corresponding age and relevant properties of a product were tested.

It was determined through tests that the fly ash solidified object obtained in Example 2 had a 3 d compressive strength of 2.8 MPa and a 28 d compressive strength of 8.4 MPa, which met the strength requirements for fly ash solidified objects in China and heavy metals such as copper, lead, chromium, cadmium, and zinc in the solidified object each had leaching toxicity lower than a standard limit value of pollution control for municipal solid waste landfill (MSWLF) in China.

Example 3

A curing agent for disposal of an MSWI fly ash was provided in this example and the curing agent was prepared from the following raw materials in parts by mass: 5 parts of a loofah nanofiber crystal, 70 parts of an RHA, 7 parts of sodium hydroxide, and 80 parts of distilled water, where a content of amorphous $SiO_2$ in the RHA was higher than or equal to 98.0% and the loofah nanofiber crystal had a diameter of 5 nm and a length of 105 nm.

Preparation Steps were as Follows:

The RHA and sodium hydroxide were dissolved in water and a resulting solution was thoroughly mixed, subjected to an excitation activation reaction for 5 h in a high-temperature bath at 130° C., and then cooled to room temperature; the loofah nanofiber crystal was added, and a resulting mixture was ultrasonically stirred at 300 rpm for 50 minutes and then poured into an agitator kettle. An MSWI fly ash was added (a mass ratio of the curing agent to the MSWI fly ash was 110:100) and a resulting mixture was stirred at a high speed for 10 minutes, then placed in a mold, vibrated for compaction and molding, taken out from the mold, and further cured at 20±2° C. until a corresponding age and relevant properties of a product were tested.

It was determined through tests that the solidified object obtained in Example 3 had a 3 d compressive strength of 5.2 MPa and a 28 d compressive strength of 14.8 MPa, which met the strength requirements for fly ash solidified objects in China and heavy metal ions such as copper, lead, chromium, cadmium, and zinc in the solidified object each had leaching toxicity far lower than a standard limit value of pollution control for MSWLF in China.

Example 4

A curing agent for disposal of an MSWI fly ash was provided in this example and the curing agent was prepared from the following raw materials in parts by mass: 4 parts of a loofah nanofiber crystal, 100 parts of an RHA, 6 parts of sodium hydroxide, and 80 parts of distilled water, where a content of amorphous $SiO_2$ in the RHA was higher than or equal to 97.0% and the loofah nanofiber crystal had a diameter of 15 nm and a length of 450 nm.

Preparation Steps were as Follows:

The RHA and sodium hydroxide were dissolved in water and a resulting solution was thoroughly mixed, subjected to an excitation activation reaction for 4 h in a high-temperature bath at 105° C., and then cooled to room temperature. The loofah nanofiber crystal was added and a resulting mixture was ultrasonically stirred at 500 rpm for 60 minutes and then poured into an agitator kettle. An MSWI fly ash was added (a mass ratio of the curing agent to the MSWI fly ash was 70:100) and a resulting mixture was stirred at a high speed for 12 minutes, then placed in a mold, vibrated for compaction and molding, taken out from the mold, and further cured at 20±2° C. until a corresponding age and relevant properties of a product were tested.

It was determined through tests that the solidified object obtained in Example 4 had a 3 d compressive strength of 7.2 MPa and a 28 d compressive strength of 18.4 MPa, which met the strength requirements for fly ash solidified objects in China and heavy metal ions such as copper, lead, chromium, cadmium, and zinc in the solidified object each had leaching toxicity lower than a standard limit value of pollution control for MSWLF in China.

Curing rates for heavy metals in the solidified objects obtained in Examples 1 to 4 were tested and test results were shown in Table 1:

TABLE 1

Curing rates for heavy metals in the solidified objects obtained in Examples 1 to 4 (%)

| Heavy metal | Example 1 | Example 2 | Example 3 | Example 4 |
| --- | --- | --- | --- | --- |
| $Pb^{2+}$ | 99.7 | 90.8 | 95.5 | 99.1 |
| $Zn^{2+}$ | 99.4 | 92.6 | 96.3 | 98.8 |
| $Cd^{2+}$ | 99.5 | 92.2 | 97.2 | 98.7 |
| $Cr^{3+}$ | 98.7 | 95.8 | 96.8 | 97.6 |
| $Cu^{2+}$ | 99.5 | 94.7 | 98.5 | 98.9 |

It can be known from the above examples that the present disclosure provides a curing agent for disposal of an MSWI fly ash and a preparation method and use method thereof. In the present disclosure, a loofah nanofiber crystal, an RHA, sodium hydroxide, and water are adopted as raw materials to prepare the curing agent and the curing agent can effectively realize the safe disposal and curing of heavy metals in an MSWI fly ash. The highest curing rates of the curing agent for heavy metals $Pb^{2+}$, $Zn^{2+}$, $Cd^{2+}$, $Cr^{3+}$, and $Cu^{2+}$ can reach 99.7%, 99.4%, 99.5%, 98.7%, and 99.5%, respectively. The curing agent of the present disclosure makes full use of the special 3D cross-linked network structure of the loofah nanofiber crystal and the excellent physical and chemical adsorption properties and ion exchange capacity of the RHA and can significantly reduce the migration and infiltration of heavy metals and organic pollutants of an MSWI fly ash in an ecological environment and effectively improve a reutilization level of solid waste.

The above descriptions are merely preferred implementations of the present disclosure. It should be noted that a person of ordinary skill in the art may further make several improvements and modifications without departing from the principle of the present disclosure, but such improvements and modifications should be deemed as falling within the protection scope of the present disclosure.

What is claimed is:

1. A curing agent for disposal of a municipal solid waste incineration (MSWI) fly ash, wherein the curing agent is prepared from the following raw materials in parts by mass:
   loofah nanofiber crystal 1 to 10 parts;
   rice husk ash (RHA) 30 to 100 parts;
   sodium hydroxide 4 to 10 parts; and
   water 60 to 100 parts,
   the loofah nanofiber crystal is configured to be adsorbed on a surface of the MSWI fly ash and comprises a plurality of hydrophilic and lipophilic groups and active sites for adsorbing heavy metals in the MSWI fly ash;
   the RHA has a specific surface area of 100 $m^2/g$ and is configured to provide a plurality of nanopores for adsorbing and curing the heavy metals; and
   the sodium hydroxide is configured to excite and activate the RHA and to regulate a structure of the loofah nanofiber crystal.

2. The curing agent for disposal of the MSWI fly ash according to claim 1, wherein the loofah nanofiber crystal has a diameter of 5 nm to 30 nm and a length of 50 nm to 500 nm.

3. The curing agent for disposal of the MSWI fly ash according to claim 1, wherein a content of amorphous $SiO_2$ in the RHA is higher than or equal to 95.0%.

4. A preparation method of the curing agent for disposal of the MSWI fly ash according to claim 1, comprising the following steps:
   1) mixing the RHA, the sodium hydroxide, and the water, and subjecting a resulting mixture to an excitation activation reaction to obtain a reaction mixed solution; and
   2) dispersing the loofah nanofiber crystal in the reaction mixed solution to obtain the curing agent.

5. The preparation method according to claim 4, wherein in step 1), the excitation activation reaction is conducted at 80° C. to 160° C. for 2 h to 6 h.

6. The preparation method according to claim 5, wherein in step 2), the dispersing is achieved by an ultrasonic stirring, and the ultrasonic stirring is conducted at a rotational speed of 300 rpm to 500 rpm for 30 minutes to 60 minutes.

7. A method of obtaining an MSWI fly ash solidified object, comprising: mixing the curing agent according to claim 1 with the MSWI fly ash and stirring a resulting mixture for 3 minutes to 15 minutes to obtain an MSWI fly ash curing slurry and placing the MSWI fly ash curing slurry in a mold, vibrating for compaction, and curing at room temperature to obtain the MSWI fly ash solidified object.

8. The method of obtaining the MSWI fly ash solidified object according to claim 7, wherein a mass ratio of the curing agent to the MSWI fly ash is (30-120):100.

9. The curing agent for disposal of the MSWI fly ash according to claim 2, wherein a content of amorphous $SiO_2$ in the RHA is higher than or equal to 95.0%.

10. The preparation method according to claim 4, wherein the loofah nanofiber crystal has a diameter of 5 nm to 30 nm and a length of 50 nm to 500 nm.

11. The preparation method according to claim 4, wherein a content of amorphous $SiO_2$ in the RHA is higher than or equal to 95.0%.

12. The method of obtaining the MSWI fly ash solidified object according to claim 7, wherein the loofah nanofiber crystal has a diameter of 5 nm to 30 nm and a length of 50 nm to 500 nm.

13. The method of obtaining the MSWI fly ash solidified object according to claim 7, wherein a content of amorphous $SiO_2$ in the RHA is higher than or equal to 95.0%.

* * * * *